US012728052B2

(12) United States Patent
Cox

(10) Patent No.: US 12,728,052 B2
(45) Date of Patent: Sep. 8, 2026

(54) WHEELCHAIR PROPULSION SYSTEM

(71) Applicant: Todd Cox, Fort Collins, CO (US)

(72) Inventor: Todd Cox, Fort Collins, CO (US)

( * ) Notice: Subject to any disclaimer, the term of this patent is extended or adjusted under 35 U.S.C. 154(b) by 450 days.

(21) Appl. No.: 18/240,992

(22) Filed: Aug. 31, 2023

(65) Prior Publication Data

US 2025/0073102 A1 Mar. 6, 2025

(51) Int. Cl.
*A61G 5/02* (2006.01)
*A61G 5/04* (2013.01)

(52) U.S. Cl.
CPC ............. *A61G 5/023* (2013.01); *A61G 5/026* (2013.01); *A61G 5/04* (2013.01)

(58) Field of Classification Search
CPC ........... A61G 5/023; A61G 5/026; A61G 5/04
See application file for complete search history.

(56) References Cited

U.S. PATENT DOCUMENTS

| | | | | |
|---|---|---|---|---|
| 4,560,181 | A | 12/1985 | Herron | |
| 4,572,501 | A * | 2/1986 | Durham | A63B 22/001 601/36 |
| 4,758,013 | A | 7/1988 | Agrillo | |
| 5,037,120 | A * | 8/1991 | Parisi | A61G 5/022 74/413 |
| 5,423,563 | A | 6/1995 | Wild | |
| 6,007,082 | A | 12/1999 | Watwood et al. | |
| 6,234,504 | B1 | 5/2001 | Taylor | |
| 6,409,195 | B1 | 6/2002 | Adams | |
| 6,715,780 | B2 | 4/2004 | Schaeffer et al. | |
| 6,755,430 | B1 | 6/2004 | Watwood et al. | |
| 6,910,701 | B1 * | 6/2005 | Long | A61G 5/026 280/250 |
| 7,677,586 | B2 | 3/2010 | Bloom | |
| 7,837,210 | B2 | 11/2010 | Kystra et al. | |
| 7,900,945 | B1 | 3/2011 | Rackley | |
| 8,087,684 | B2 | 1/2012 | Bloswick et al. | |
| 10,940,063 | B2 | 3/2021 | Eason | |
| 10,993,860 | B2 | 5/2021 | McNally | |
| 2006/0131832 | A1 | 6/2006 | Lindsay et al. | |
| 2015/0028558 | A1 | 1/2015 | Hartman et al. | |

FOREIGN PATENT DOCUMENTS

| | | | | |
|---|---|---|---|---|
| CA | 1196936 A | * 11/1985 | | A61G 5/026 |
| CN | 102204858 A | * 10/2011 | | |
| WO | WO 2006/116623 A2 | 11/2006 | | |
| WO | WO-2017075113 A1 | * 5/2017 | | B62M 1/12 |

* cited by examiner

*Primary Examiner* — Jacob D Knutson
(74) *Attorney, Agent, or Firm* — Craig R. Miles; CR MILES P.C.

(57) ABSTRACT

A wheelchair including a wheelchair propulsion system adapted to independently operate each of a pair of drive wheels by corresponding independent manual rotation of a pair of cranks.

13 Claims, 8 Drawing Sheets

WHEELCHAIR PROPULSION SYSTEM

I. FIELD OF THE INVENTION

A wheelchair including a wheelchair body having a pair of drive wheels rotationally secured to the wheelchair body and a wheelchair propulsion system adapted to independently operate each of said pair of drive wheels rotationally secured to said wheelchair body by corresponding independent manual rotation of a pair of cranks by a seated wheelchair user.

II. BACKGROUND OF THE INVENTION

Although advancements have been made, the basic structure of manual wheelchairs remains largely unchanged over the past century. The basic structure affords a wheelchair body having at least two supporting wheels rotatably secured on opposite sides of the wheelchair body.

The mode of propelling the basic wheelchair involves repetitive manual hand pushes on the two main supporting wheels or on the push rims coupled to the two main supporting wheels. In repetitive manual pushes, each push creates rotational motion in one or more of the two main supporting wheels. The push is then interrupted by a push pause as the user resets the hands on the two main supporting wheels or push rims. An active wheelchair user may push 2000-3000 times per day followed by an equal number of push pauses. Each push pause can create a loss of momentum in the wheelchair. Thus, manually propelling a wheelchair has a low mechanical efficiency. The energy put in to push-pause propulsion of the wheelchair may not be proportional to the movement of the wheelchair. Additionally, basic wheelchairs may not afford user control on inclined surfaces, other than by greater magnitude in the push to move up an incline along with resistive push to brake the wheelchair against motion down the incline. Due to these factors, upper extremity injuries of wheelchair users due to manual wheelchair propulsion is common, especially in the shoulders, wrists and hands.

Alternative modes of propulsion have been proposed over the years including certain types of cranks, geared hubs, ratchet wheels, fluid pumps, levers, and the like. However, in the first instance, certain alternative propulsive mechanisms may not substantially improve mechanical efficiency in manual wheelchair operation due to similar push-pause or pull-pause in manual operation of the propulsive mechanism. In the second instance, certain alterative propulsion mechanisms do not afford independent propulsion, gear selection, or braking of each main supporting wheel rotatably secured to the wheelchair body. In the third instance, certain alternative propulsion mechanisms do not mitigate the primary factors contributing to injury of wheelchair users because the alternatives require intermittent pushes followed by push pauses in manual operation, do not shift manual operation to large muscle groups, do not provide changeable speed ratio between manually engage components of the propulsion mechanism on opposite sides of the wheelchair to allow for adaptive behavior based on differences in seated wheel chair user left side capabilities and seated wheelchair user right side capabilities.

There would be substantial advantages in a wheelchair propulsion mechanism that substantially improves mechanical efficiency in manual wheelchair operation, affords independent propulsion, gear selection, and/or braking of each main supporting wheel rotatably secured to the wheelchair body, and mitigates the primary factors contributing to injury of seated wheelchair users.

III. SUMMARY OF THE INVENTION

Accordingly, a broad object of particular embodiments of the invention can be to provide a wheelchair having a propulsion mechanism disposed, mounted or retrofitted on each of the wheelchair left side and the wheelchair right side to afford a corresponding one of a pair of cranks each rotatably coupled to the wheelchair body, whereby a seated wheelchair user can independently drive each of the pair of cranks to correspondingly rotatably drive a pair of drive wheels rotatably secured to the wheelchair body. In particular embodiments, a first pair of drive members can be correspondingly operably coupled to the pair of cranks and a second pair of drive members can be rotatably coupled to the wheelchair body, wherein each of the second pair of drive members can be operatively coupled by a first circuitous member to a corresponding one of the first pair of drive members. A third pair of drive members can be rotatably coupled to the wheelchair body, wherein one the third pair of drive members can be disposed coaxially adjacent to each of the second pair of drive members and a fourth pair of drive members can be correspondingly coaxially coupled to the pair of drive wheels, wherein one of the third pair of drive members can be operatively coupled to a corresponding one of the fourth pair of drive members with a second circuitous member, whereby operation of the pair of cranks correspondingly generates rotation in the pair of drive wheels of the wheelchair. In particular embodiments, a pair of transmissions each having a drive shaft coupled to a corresponding one of the second pair of drive members and having a hub coupled to a corresponding one of the third pair of drive members can be independently operable by a corresponding one of a pair of speed ratio selectors to change a speed ratio between a corresponding one of the second pair of drive members coupled to the drive shaft and one of the third pair of drive member coupled to the hub of a corresponding one of the pair of transmissions.

Another broad object of embodiments of particular embodiments of the invention can be to provide a method of making a wheelchair including a propulsion mechanism including one or more of: disposing, mounting or retrofitting a propulsion mechanism on each of the wheelchair left side and the wheelchair right side, wherein rotatably coupling one of a pair of cranks to the wheelchair body left side and one of a pair of cranks to the wheelchair body right side allows a seated wheelchair user to independently manually hand drive each of the pair of cranks to correspondingly rotatably drive each of a pair of drive wheels rotatably secured to the wheelchair body. In particular embodiments, the method includes coupling a first pair of drive members to a corresponding one of the pair of cranks and rotatably coupling a second pair of drive members to the wheelchair body, and operably coupling each of the second pair of drive members to a corresponding one of the first pair of drive members with a first circuitous member. The method can further include rotatably coupling a third pair of drive members to said wheelchair body coaxially adjacent to each of the second pair of drive members and correspondingly coaxially coupling one of a fourth pair of drive members to each the pair of drive wheels, and operably coupling each of the third pair of drive members to a corresponding one of the fourth pair of drive members with a second circuitous member, whereby operation of the pair of cranks correspondingly generates rotation in the pair of drive wheels of the wheelchair. In particular embodiments, the method includes coupling a pair of transmissions to the wheelchair body, wherein each of the pair of transmissions having a drive shaft coupled to a corresponding one of the second pair of drive members and having a hub coupled to a corresponding one of the third pair of drive members, wherein a seated wheelchair user can independently manually operate one of a pair of speed ratio selectors coupled to each of the pair of transmissions to change a speed ratio between a corresponding one of second pair of drive members coupled to the drive shaft and one of the third pair of drive member coupled to the hub of a corresponding one of the pair of transmissions.

Another broad object of particular embodiments of the invention can be to provide a method of using a wheelchair having a propulsion mechanism disposed, mounted or retrofitted on each of the wheelchair left side and the wheelchair right side to afford a corresponding one of a pair of cranks each rotatably coupled to the wheelchair body. The method can include one or more of: seating a wheelchair user in a wheel chair having a propulsion mechanism disposed, mounted or retrofitted on each of the wheelchair left side and the wheelchair right side to afford a pair of cranks each rotatably coupled to the wheelchair body; and independently manually operating each of the pair of cranks by the seated wheelchair user to correspondingly rotatably drive each of a pair of drive wheels rotatably secured to the wheelchair body. In particular embodiments, the method can include rotating a first pair of drive members operably coupled to the pair of cranks and rotating a second pair of drive members rotatably coupled to the wheelchair body, wherein each of the first pair of drive members can be operatively coupled by a first circuitous member to a corresponding one of the second pair of drive members. The method can further include rotating a third pair of drive members rotatably coupled to the wheelchair body, wherein one of the third pair of drive members coaxially adjacently disposed to each of the second pair of drive members, and rotating a fourth pair of drive members correspondingly coaxially coupled to the pair of drive wheels, wherein one of the third pair of drive members operatively coupled to a corresponding one of the fourth pair of drive members by a second circuitous member, whereby operating the pair of cranks by the seated wheelchair user correspondingly generates rotation in the pair of drive wheels of the wheelchair. In particular embodiments, the method can further include operating one of a pair of speed ratio selectors correspondingly coupled to each of a pair of transmissions to change a speed ratio between one of the second pair of drive members coupled to the drive shaft of a corresponding one of the pair of transmissions and a corresponding one of the third pair of drive members coupled to the hub of a corresponding one of the pair of transmissions.

Naturally, further objects of the invention are disclosed throughout other areas of the specification, drawings, photographs, and claims.

IV. BRIEF DESCRIPTION OF THE DRAWINGS

V. DETAILED DESCRIPTION OF THE INVENTION

Figure 1:
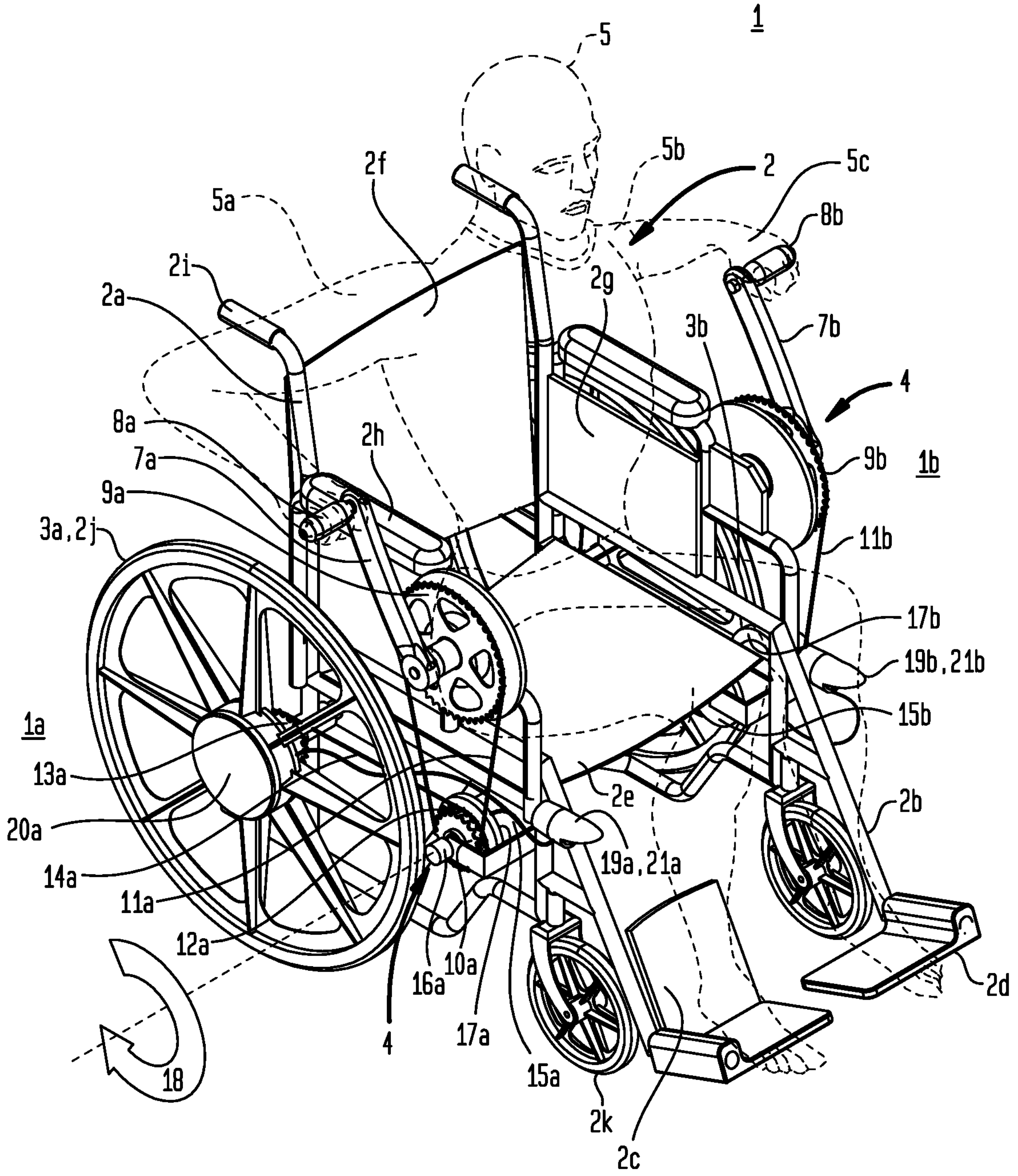
FIG. 1 is a perspective view of a particular embodiment of the inventive wheelchair, wherein the broken line represents a seated wheelchair user.
Figure 2:
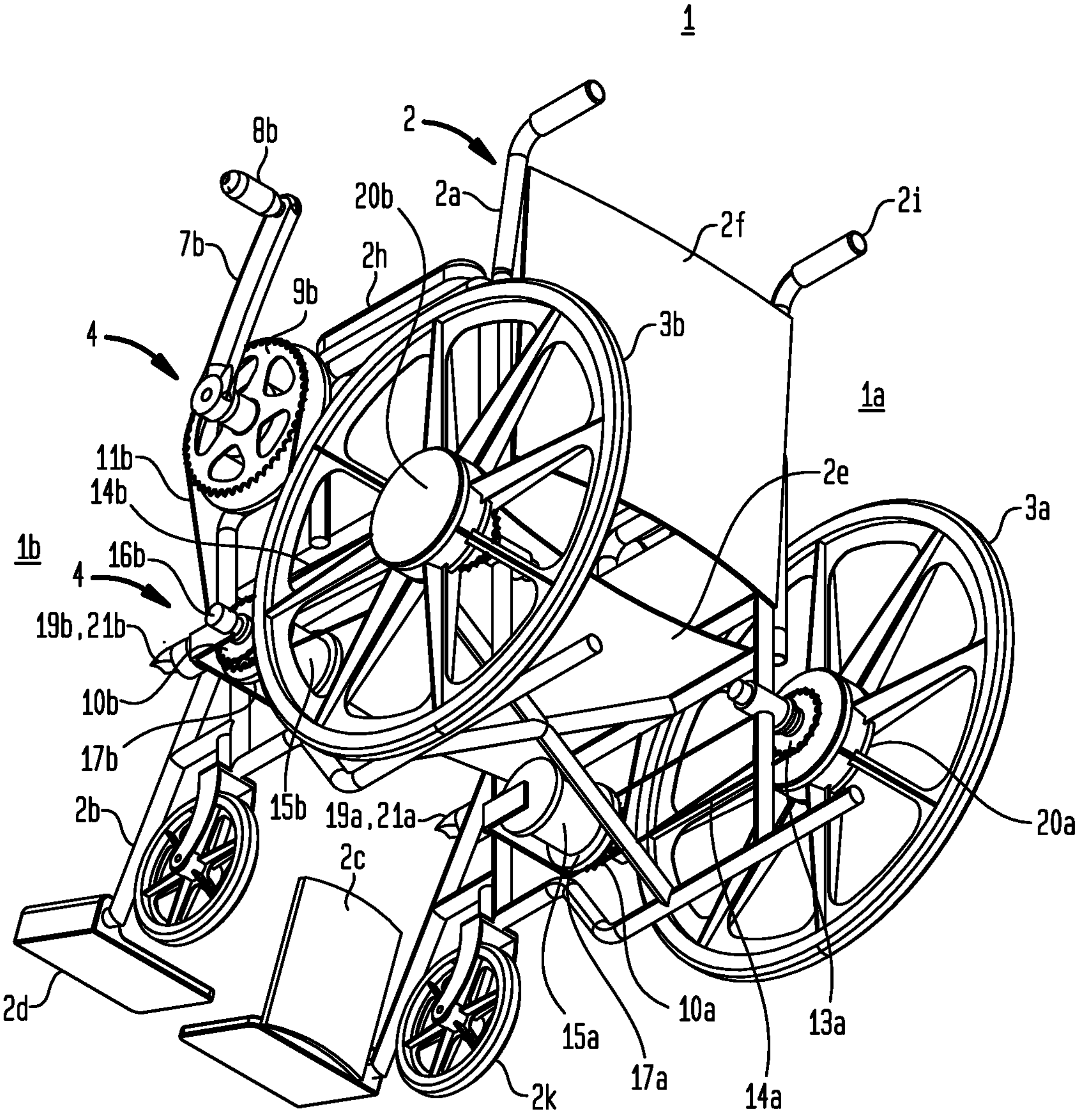
FIG. 2 is a rear perspective view of the wheelchair.
Figure 3:
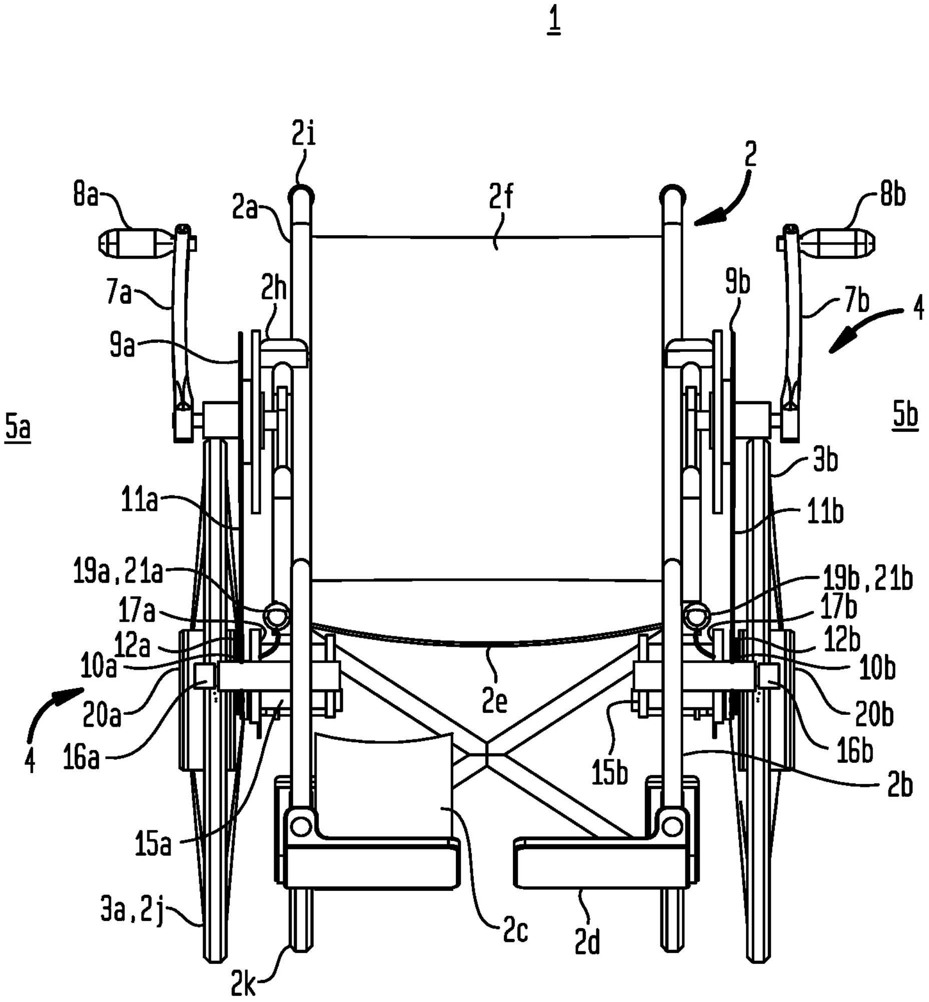
FIG. 3 is a front elevation view of the wheelchair.
Figure 4:
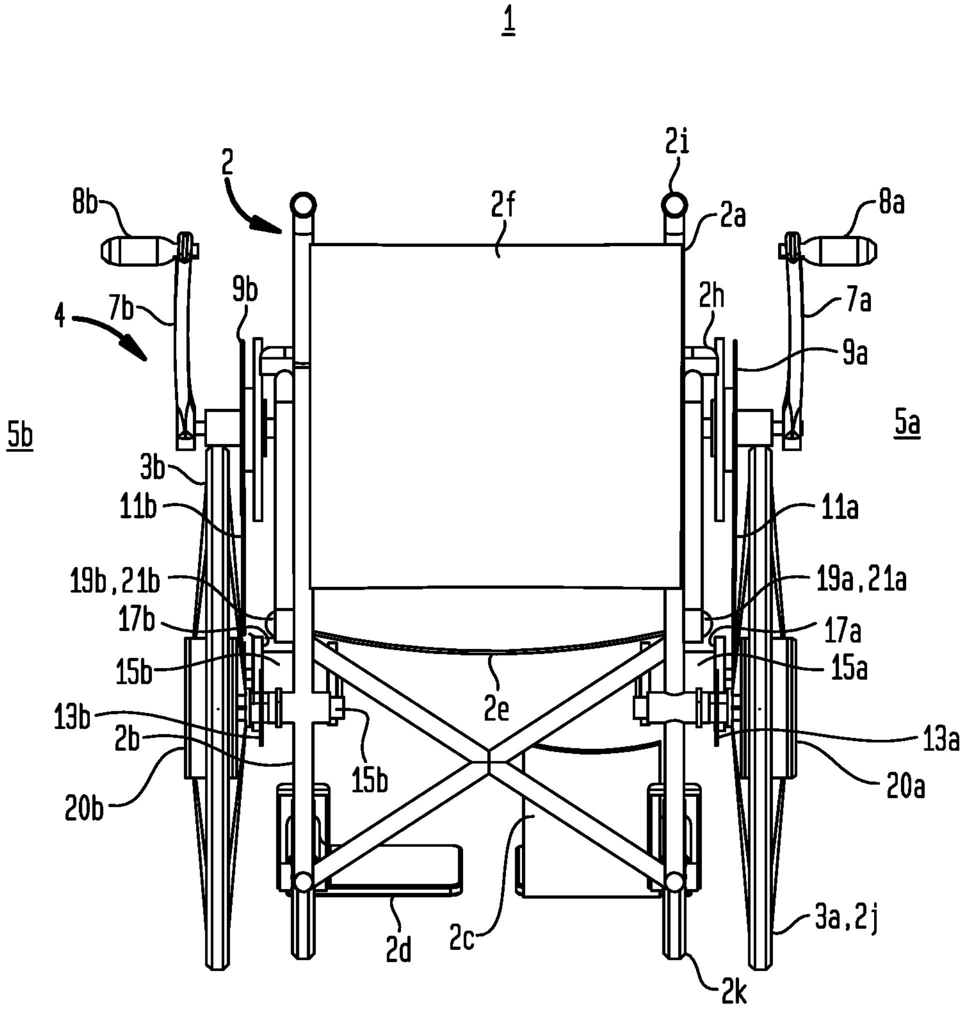
FIG. 4 is a rear elevation view of the wheelchair.
Figure 5:
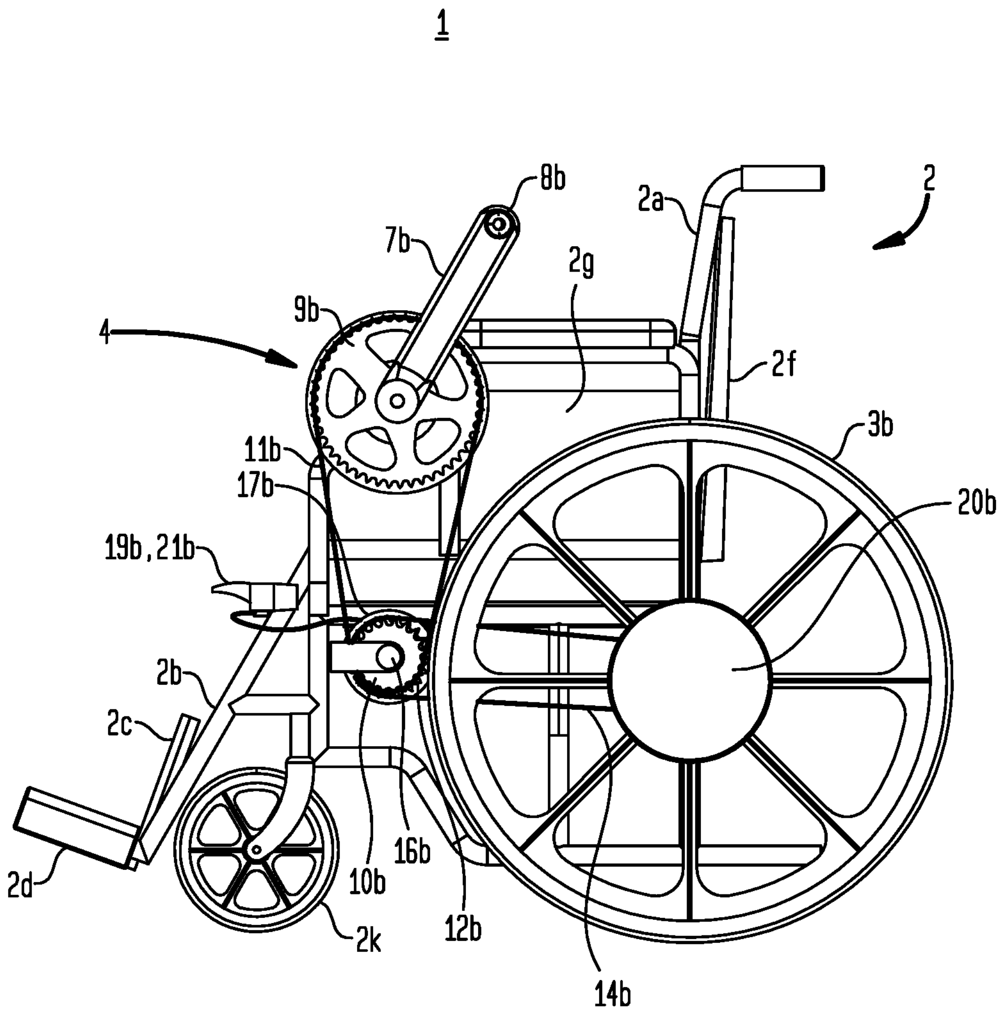
FIG. 5 is first side elevation view of the wheelchair.
Figure 6:
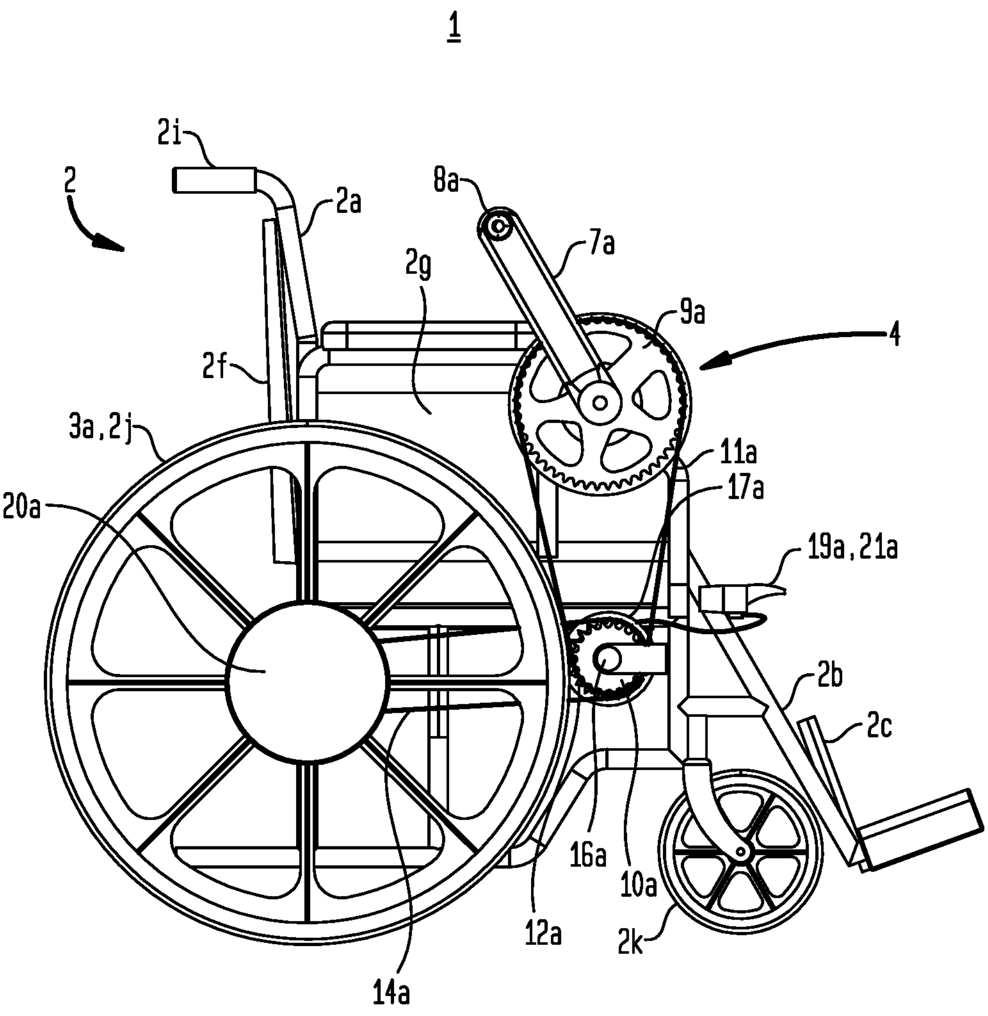
FIG. 6 is a second side elevation view of the wheelchair.
Figure 7:
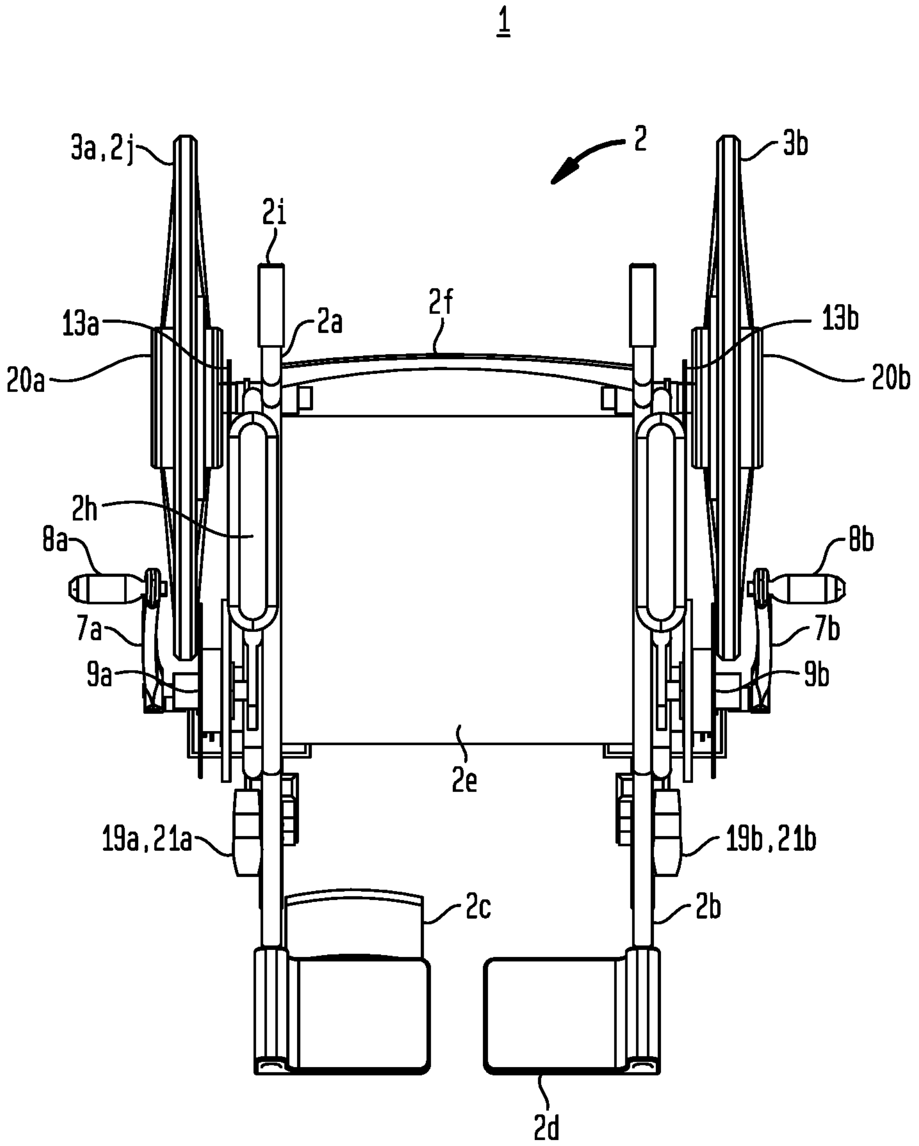
FIG. 7 is a top plan view of the wheelchair.
Figure 8:
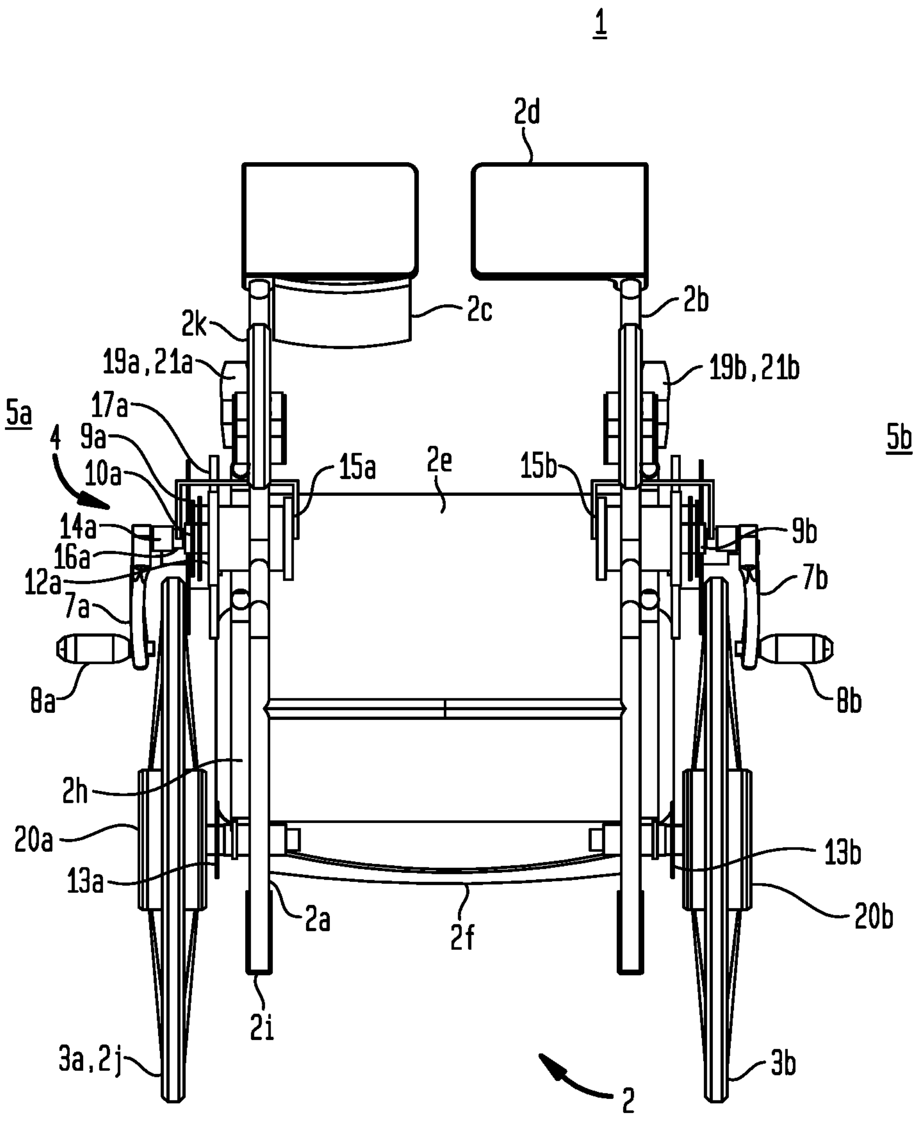
FIG. 8 is a bottom plan view of the wheelchair.

Generally, referring to FIGS. 1 through 8, which depict a wheelchair (1) including a wheelchair body (2) having a pair of drive wheels (3*a*, 3*b*) rotatably secured to the wheelchair body (2). A propulsion mechanism (4) can be mounted on opposite sides of the wheelchair body (2) to allow manual operation by a seated wheel chair user (5) of the propulsion mechanism (4) mounted on the wheelchair first side (la) to drive a first of the pair of drive wheels (3*a*) and operation by the seated wheel chair user (5) of the propulsion mechanism (4) mounted to the wheelchair second side (1*b*) to drive the second of the pair of drive wheels (3*b*). The propulsion mechanism (4) can be manually operated to drive the first of the pair of drive wheels (3*a*) individually from or concurrently with a second of the pair of drive wheels (3*b*). Manual operation of the propulsion mechanism (4) to concurrently drive both the first and the second of the pair of drive wheels (3*a*, 3*b*) does not require that the propulsion mechanism (4) on the wheelchair first side (la) and the wheelchair second side (1*b*) be manually operated at the same rate or using similar manual operational force, or drive the first and the second of the pair of drive wheels (3*a*, 3*b*) at the same rate of rotation. Accordingly, the mechanical propulsion mechanism (4) can be adapted or configured to allow dissimilar manual operation on the wheelchair first side (la) and the wheelchair second side (1*b*). Thereby, particular embodiments of the inventive wheelchair (1) can accommodate dissimilar anatomical structure, posture, physical abilities, or adaptive use between the seated wheelchair user left-hand side (5*a*) and the seated wheelchair user right-hand side (5*b*) of a seated wheelchair user (5). In particular embodiments, the propulsion mechanism (4) can be retrofitted to an existing wheelchair to produce embodiments of the inventive wheelchair (1). In particular embodiments, the propulsion mechanism (4) can be provided as a kit to retrofit an existing wheelchair to produce embodiments of the inventive wheelchair (1).

Again, with primary reference to FIGS. 1 through 8, particular embodiments of the inventive wheelchair (1) can include a wheelchair body (2). Embodiments of the wheelchair body (2) can include a wheelchair frame (2*a*) configured to support one or more of: a front rigging (2*b*), a leg rest (2*c*), a footrest (2*d*), a seat (2*e*), a backrest (2*f*), a skirt (2*g*), an armrest (2*h*), push handles (2*i*), rear wheels (2*j*) (which can comprise a pair of drive wheels (3*a*, 3*b*)), and caster wheels (2*k*). However, embodiments of the wheelchair body (2) need not necessarily be configured to support all of these elements, and particular embodiments of a wheelchair body (2) can be adapted to, configured to, or retrofit to rotatably secure a pair of drive wheels (3*a*, 3*b*) and the propulsion mechanism (4) operable to independently drive each of the pair of drive wheels (3*a*, 3*b*) rotatably secured to the wheelchair body (2) with other elements being optional in various permutations and combinations.

Again, with primary reference to FIGS. 1 through 8, particular embodiments of the propulsion mechanism (4) can comprise a pair of cranks (7*a*, 7*b*) a first of the pair of cranks (7*a*) rotatably coupled to a wheelchair body first side (la) and a second of the pair of cranks (7*b*) rotatably coupled to a wheelchair body second side (1*b*). The first of the pair of cranks (7*a*) adapted to operate independently from operation of the second of said pair of cranks (7*b*). The first and the second cranks (7*a*, 7*b*) can be disposed at a position and configured to be rotatably operated by a seated wheelchair user (5). In particular embodiments, each of the first and second cranks (7*a*, 7*b*) can be configured to be length adjustable. As one illustrative example, telescoping crank members can be adjustably telescopingly engaged and disposed in fixed spatial relation based the anatomy of the seated wheelchair user (5).

In particular embodiments, a pair of handles (8*a*, 8*b*) can be correspondingly coupled to the pair of cranks (7*a*, 7*b*). While the illustrative example depicts each of the pair of handles (8*a*, 8*b*) as outwardly extending or as generally orthogonally outwardly extending from a corresponding one of the pair of cranks (7*a*, 7*b*); this illustrative example is not intended to preclude configurations of the pair of handles (7*a*, 7*b*) adapted to or configured to be gripped by a hand (5*c*) of a seated wheelchair user (5). In particular embodiments, the pair of handles (7*a*, 7*b*) can each inwardly fold toward said pair of cranks (7*a*, 7*b*) to facilitate conventional manual push operation of the wheelchair (1) or to narrow the profile of the wheelchair (1) from the wheelchair first side (la) to the wheelchair second side (1*b*).

Now, with primary reference to FIGS. 3 through 8, particular embodiments can further comprise a first pair of drive members (9*a*, 9*b*) correspondingly rotatably coupled to a wheelchair first side (la) and a wheelchair second side (1*b*). One of the first pair of drive members (9*a*, 9*b*) can be correspondingly coupled to each of the pair of cranks (7*a*, 7*b*). The rotational operation of each one of the pair of cranks (7*a*, 7*b*) can correspondingly rotate one of the first pair of drive members (7*a*, 7*b*).

Again, with primary reference to FIGS. 3 through 8, a second pair of drive members (10*a*, 10*b*) can be rotatably coupled to the wheelchair body (2). The first of the second pair of drive members (10*a*) can be rotatably coupled to the wheelchair first side (la) and a second of the second pair of drive members (10*b*) can be rotatably coupled to the wheelchair second side (1*b*). The second pair of drive members (10*a*, 10*b*) can be correspondingly operatively coupled to the first pair of drive members (9*a*, 9*b*) by a first pair of circuitous members (11*a*, 11*b*). Operation of either one of the pair of cranks (7*a* or 7*b*) rotates a corresponding one of the first pair of drive members (9*a* or 9*b*) generating circuitous travel in the corresponding one of the first pair of circuitous members (11*a* or 11*b*) to rotate a corresponding one of the second pair of drive members (10*a* or 10*b*). In particular embodiments, the first pair of drive members (9*a*, 9*b*) and the second pair of drive members (10*a*, 10*b*) can each comprise a sprocket and the first pair of circuitous members (11*a*, 11*b*) can each comprise a roller chain, each as depicted in the illustrative examples of the Figures. In other particular embodiments, the first pair of drive members (9*a*, 9*b*) and the second pair of drive members (10*a*, 10*b*) can each comprise a pulley and each of the first pair of circuitous members (11*a*, 11*b*) can comprise a belt.

Again, with primary reference to FIGS. 3 through 8, a third pair of drive members (12*a*, 12*b*) can be rotatably coupled to the wheelchair body (2). One of the third pair of drive members (12*a* or 12*b*) can be coaxially rotatably coupled adjacent a corresponding one of second pair of drive members (10*a* or 10*b*). In particular embodiments, operational rotation of one of the second pair of drive members (10*a* or 10*b*) can generate rotation of a corresponding one of the third pair of drive members (12*a* or 12*b*).

Again, with primary reference to FIGS. 3 through 8, a fourth pair of drive members (13*a*, 13*b*) can be correspondingly coaxially coupled to the pair of drive wheels (3*a*, 3*b*). The third pair of drive members (12*a*, 12*b*) can be correspondingly operatively coupled to the fourth pair of drive members (13*a*, 13*b*) by a second pair of circuitous members (14*a*, 14*b*). Operation of either one of the pair of cranks (7*a* or 7*b*) can rotate a corresponding one of the third pair of drive members (12*a* or 12*b*) generating circuitous travel in the corresponding one of the second pair of circuitous members (14*a* or 14*b*) to rotate a corresponding one of the fourth pair of drive members (13*a* or 13*b*). In particular embodiments, the third pair of drive members (12*a*, 12*b*) and the fourth pair of drive members (13*a*, 13*b*) can each comprise a sprocket and the second pair of circuitous members (14*a*, 14*b*) can each comprise a roller chain as depicted in the illustrative examples of the Figures. In other particular embodiments, the third pair of drive members (12*a*, 12*b*) and the fourth pair of drive members (13*a*, 13*b*) can each comprise a pulley and each of the second pair of circuitous members (14*a*, 14*b*) can comprise a belt.

Again, with primary reference to FIGS. 1 and 3 through 8, in particular embodiments, a pair of transmissions (15*a*, 15*b*) can be correspondingly affixed to the wheelchair first side (la) and the wheelchair second side (1*b*). Each one of the pair of transmissions (15*a*, 15*b*) can be configured to include a drive shaft (16*a*, 16*b*) rotatable to correspondingly drive a hub (17*a*, 17*b*) about the corresponding drive shaft (16*a*, 16*b*). In particular embodiments, one of the second pair of drive members (10*a*, 10*b*) can be correspondingly coupled to a drive shaft (16*a*, 16*b*) of the pair of transmissions (15*a*, 15*b*), whereby rotation of a corresponding one of the first pair of drive members (9*a*, 9*b*) results in rotation of a corresponding drive shaft (16*a*, 16*b*) resulting in rotation of a corresponding hub (17*a*, 17*b*). One of the third pair of drive members (12*a*, 12*b*) can be corresponding coaxially coupled to one of the hubs (17*a*, 17*b*), whereby rotation of the hub (17*a* or 17*b*) correspondingly rotates one of the third pair of drive members (12*a* or 12*b*) which by circuitous travel of a corresponding one of the second pair of circuitous members (14*a*, 14*b*) rotates one of the fourth pair of drive members (13*a*, 13*b*) to rotate one of the pair of drive wheels (3*a*, 3*b*).

In particular embodiments, each of the pair of transmissions (15*a*, 15*b*) can be configured to allow the corresponding hub (17*a*, 17*b*) to rotate freely about the drive shaft (16*a*, 16*b*) in the event that the corresponding one of the second pair of drive members (10*a*, 10*b*) remains stationary. This feature allows one or both of the pair of drive wheels (3*a*, 3*b*) to rotate freely without rotation of the corresponding one of the pair of cranks (7*a*, 7*b*) or allows one or both of the pair of drive wheels (3*a*, 3*b*) to be rotatably driven by rotation of a corresponding one of the pair of cranks (7*a*, 7*b*). Accordingly, operation of only one of the pair of cranks (7*a* or 7*b*) can afford forward motion of the wheelchair (1), or rotation of both of the pair of cranks (7*a* and 7*b*), even if the force applied to one of the pair of cranks (7*a* or 7*b*) exceeds that of the other one of the pair of cranks (7*a*, 7*b*), can achieve liner travel of the wheelchair (1). There can be an advantage in this configuration in the event that the seated wheelchair user (5) cannot operate both of the pair of cranks (7*a*, 7*b*), or cannot operate both of the pair of cranks (7*a*, 7*b*) with equal force or equal speed.

In particular embodiments, each of the pair of transmissions (15*a*, 15*b*) can be configured to resist rotation of a corresponding hub (17*a*, 17*b*) in the event that the corresponding one of the second pair of drive members (10*a*, 10*b*) exerts a rotational force opposite that of the rotational direction of the corresponding hub (17*a*, 17*b*). Accordingly, operation of one of the pair of cranks (7*a* or 7*b*) to exert a force on one of the second pair of drive members (10*a*, 10*b*)

opposite the rotation of the hub (17*a*, 17*b*) can generate a left turn or a right turn of the wheelchair (1).

In particular embodiments, each of the pair of transmissions (15*a*, 15*b*) can be configured to afford two or more speed ratios (18) between the rotation of one of the second pair of drive members (10*a*, 10*b*) and the corresponding one of the third pair of drive members (12*a*, 12*b*). In particular embodiments, one of a pair of speed ratio selectors (19*a*, 19*b*) can be correspondingly affixed to the wheelchair first side (la) and to the wheelchair second side (1*b*) and can be correspondingly coupled to each of the pair of transmissions (15*a*, 15*b*). Each of the pair of speed ratio selectors (19*a*, 19*b*) can be independently operable to shift a corresponding one of the pair of transmissions (15*a*, 15*b*) to change the speed ratio (18) between one of the second pair of drive members (10*a*, 10*b*) and the corresponding one of the third pair of drive members (12*a*, 12*b*). Typically, operation of the wheelchair (1) disposes each the pair of transmissions (15*a*, 15*b*) in the same speed ratio (18); however, this is not intended to preclude operation of the wheelchair (1) with the pair of transmissions (15*a*, 15*b*) disposed in different speed ratios (18). There can be an advantage in operation of the wheelchair (1) with the pair of transmissions disposed in different speed ratios (18) to compensate for differences in seated wheelchair user left-hand side (5*a*) and seated wheelchair user right-hand side (5*b*) capabilities of the seated wheelchair user (5). In particular, each of the pair of transmissions (15*a*, 15*b*) can include a hub (17*a*, 17*b*) defining an internal ring gear engaged by planetary gears driven by the corresponding drive shaft (16*a*, 16*b*) about a sun gear. Each one of the pair of transmissions (15*a*, 15*b*) can define one or more speed ratios (18), based on whether the planetary gears or the sun gear remain stationary. As an illustrative example, a pair of Sturmey Archer, Part No. SRC 3 three speed hub can be used as the pair of transmissions (15*a*, 15*b*) in particular embodiments of the invention to provide in each of the pair of transmissions (15*a*, 15*b*) a first speed ratio, a second speed ratio and a third speed ratio between one of the second pair of drive members (10*a*, 10*b*) and the corresponding one of the third pair of drive members (12*a*, 12*b*).

Now, with primary reference to FIGS. 1 through 8, particular embodiments of the inventive wheelchair can further include a pair of motors (20*a*, 20*b*). One of said pair of motors (20*a*, 20*b*) can be disposed to a corresponding one of the second pair of drive members (10*a*, 10*b*) or corresponding one of the third pair of drive members (12*a*, 12*b*). As an illustrative example, a motor suitable for use with motorized embodiments of the wheelchair (1) can be a Bafang 1000 W BBSHD ebike motor. In particular embodiments, the pair of motors (20*a*, 20*b*) can be disposed to correspondingly drive each of the pair of drive wheels (3*a*, 3*b*). As an illustrative example, a motor suitable for use with motorized embodiments of the wheelchair (1) can be a Bafang hub ebike motor. Particular embodiments of the inventive wheelchair (1) can further include a pair of controllers (21*a*, 21*b*), wherein one of the pair of controllers (21*a*, 21*b*) can be correspondingly coupled to each of the pair of motors (20*a*, 20*b*), each of said pair of controllers (21*a*, 21*b*) operates to regulate speed of a corresponding one of said pair of motors (20*a*, 20*b*). One or more batteries (22) can be coupled the wheelchair body (2) to provide power to each of the pair of motors (20*a*, 20*b*).

As can be easily understood from the foregoing, the basic concepts of the present invention may be embodied in a variety of ways. The invention involves numerous and varied embodiments of a wheelchair propulsion system, a wheelchair having a wheelchair propulsion mechanism, and a wheelchair propulsion mechanism and methods for making and using each of such wheelchair propulsion system, a wheelchair having a wheelchair propulsion mechanism, and a wheelchair propulsion mechanism including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "selector" should be understood to encompass disclosure of the act of "selecting"—whether explicitly discussed or not—and, conversely, were there is a disclosure of the act of "selecting", such a disclosure should be understood to encompass disclosure of a "selector" and even a "means for selecting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the wheelchair propulsion systems or wheelchair propulsion mechanism herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A wheelchair, comprising:
- a wheelchair body;
- a pair of drive wheels rotatably secured to said wheelchair body; and
- a propulsion mechanism operable to independently drive each of said pair of drive wheels rotatably secured to said wheelchair body, said propulsion mechanism including:
  - a pair of cranks each rotatably coupled to said wheelchair body, a first of said pair of cranks adapted to operate independently from operation of a second of said pair of cranks;
  - a first pair of drive members, wherein one of said first pair of drive members operably coupled to the respective one of said pair of cranks;
  - a second pair of drive members rotatably coupled to said wheelchair body, wherein one of said second pair of drive members operatively coupled to the respective one of said first pair of drive members with a first circuitous member;
  - a third pair of drive members rotatably coupled to said wheelchair body, wherein one of said third pair of drive members disposed coaxially and adjacent to the respective one of said second pair of drive members;
  - a fourth pair of drive members, wherein one of said fourth pair of drive members coaxially coupled to the respective one of said pair of drive wheels, wherein one of said third pair of drive members operatively coupled to each of said fourth pair of drive members with a second circuitous member;
  - wherein an absence of rotation of said first of said pair of cranks or second of said pair of cranks uncouples corresponding operation of one of said third pair of drive members and said fourth pair of drive members from corresponding operation of one said first pair of drive members and said second pair of drive members.

2. The wheelchair of claim 1, wherein one or more of said first pair of drive members, said second pair of drive members, said third pair of drive members, and said fourth pair drive members comprise a sprocket, and wherein one or more of said first circuitous member and said second circuitous member comprise a roller chain.

3. The wheelchair of claim 1, wherein one or more of said first pair of drive members, said second pair of drive members, said third pair of drive members, and said fourth pair drive members comprise a pulley, and wherein one or more of said first circuitous member and said second circuitous member comprise a belt.

4. The wheelchair of claim 1, wherein rotation of the first one of said pair of cranks operably rotates a first one of said pair of drive wheels, and wherein rotation of said second one of said pair of cranks operably rotates a second one of said pair of drive wheels, and wherein operable rotation of said first one of said pair of drive wheels occurs independent of operable rotation of said second one of said pair of drive wheels.

5. The wheelchair of claim 1, further comprising a pair of handles correspondingly coupled to said pair of cranks, each of said pair of handles adapted to a grip of a hand of a user of said wheelchair, said pair of handles each inwardly fold toward said pair of cranks.

6. A wheelchair, comprising:

a wheelchair body;

a pair of drive wheels rotatably secured to said wheelchair body; and a propulsion mechanism operable to independently drive each of said pair of drive wheels rotatably secured to said wheelchair body, said propulsion mechanism including:

a pair of cranks each rotatably coupled to said wheelchair body, a first of said pair of cranks adapted to operate independently from operation of a second of said pair of cranks;

a first pair of drive members, wherein one of said first pair of drive members operably coupled to the respective one of said pair of cranks;

a second pair of drive members rotatably coupled to said wheelchair body, wherein one of said second pair of drive members operatively coupled to the respective one of said first pair of drive members with a first circuitous member;

a third pair of drive members rotatably coupled to said wheelchair body, wherein one of said third pair of drive members disposed coaxially and adjacent to the respective one of said second pair of drive members;

a fourth pair of drive members, wherein one of said fourth pair of drive members coaxially coupled to the respective one of said pair of drive wheels, wherein one of said third pair of drive members operatively coupled to each of said fourth pair of drive members with a second circuitous member; and a pair of transmissions, wherein one of said pair of transmissions coupled to the respective one of said second pair of drive members or to the respective one of said third pair of drive members.

7. The wheelchair of claim 6, wherein each of said pair of transmissions operate in an absence of rotation of said first of said pair of cranks or second of said pair of cranks to uncouple corresponding operation of one of said third pair of drive members and said fourth pair of drive members from corresponding operation of one said first pair of drive members and said second pair of drive members.

8. The wheelchair of claim 7, whereby the one of said third pair of drive members and said fourth pair of drive members uncoupled from the corresponding one of said first pair of drive members and said second pair of drive members allows free rotation of corresponding one said pair of drive wheels.

9. The wheelchair of claim 6, wherein each of said pair of transmissions independently operable to change a gear ratio between a corresponding one of said first pair of drive members coupled to a corresponding one of said second pair of drive members.

10. The wheelchair of claim 9, further comprising a pair of gear ratio selectors, one correspondingly coupled to the respective one of said pair of transmissions, each of said pair of gear ratio selectors independently operable to shift the corresponding one of said pair of transmissions to change said gear ratio between one of said first pair of drive members coupled to one of said second pair of drive members.

11. The wheelchair of claim 10, further comprising a pair of brakes each operably coupled to the corresponding one of said pair of cranks, wherein rotation of one of said cranks in a first direction correspondingly rotates one of said drive wheels, and wherein rotation of one of said cranks in a second direction slows or stops corresponding rotation of one of said drive wheels.

12. A wheelchair, comprising:

a wheelchair body:

a pair of drive wheels rotatably secured to said wheelchair body;

a propulsion mechanism operable to independently drive each of said pair of drive wheels rotatably secured to said wheelchair body, said propulsion mechanism including:

a pair of cranks each rotatably coupled to said wheelchair body, a first of said pair of cranks adapted to operate independently from operation of a second of said pair of cranks;

a first pair of drive members, wherein one of said first pair of drive members operably coupled to the respective one of said pair of cranks;

a second pair of drive members rotatably coupled to said wheelchair body, wherein one of said second pair of drive members operatively coupled to the respective one of said first pair of drive members with a first circuitous member;

a third pair of drive members rotatably coupled to said wheelchair body, wherein one of said third pair of drive members disposed coaxially and adjacent to the respective one of said second pair of drive members;

a fourth pair of drive members, wherein one of said fourth pair of drive members coaxially coupled to the respective one of said pair of drive wheels, wherein one of said third pair of drive members operatively coupled to each of said fourth pair of drive members with a second circuitous member; and a pair of motors, wherein one of said pair of motors disposed to drive the respective one of said second pair of drive members.

13. The wheelchair of claim 12, further comprising a pair of controllers, wherein one of said pair of controller correspondingly coupled to the respective one of said pair of motors, the respective one of said pair of controller operates to regulate speed of a corresponding one of said pair of motors.

* * * * *